United States Patent
Heguri et al.

(10) Patent No.: US 7,601,200 B2
(45) Date of Patent: Oct. 13, 2009

(54) METHOD OF SEPARATION/PURIFICATION FOR HIGH-PURITY SILVER CHLORIDE, AND PROCESS FOR PRODUCING HIGH-PURITY SILVER BY THE SAME

(75) Inventors: Shinichi Heguri, Niihama (JP); Masushi Kasai, Niihama (JP); Satoshi Asano, Niihama (JP); Yoshiaki Manabe, Niihama (JP); Harumasa Kurokawa, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 471 days.

(21) Appl. No.: 10/558,564

(22) PCT Filed: Aug. 31, 2004

(86) PCT No.: PCT/JP2004/012561
§ 371 (c)(1),
(2), (4) Date: Nov. 29, 2005

(87) PCT Pub. No.: WO2005/023716
PCT Pub. Date: Mar. 17, 2005

(65) Prior Publication Data
US 2007/0022840 A1     Feb. 1, 2007

(30) Foreign Application Priority Data
Sep. 2, 2003   (JP) ............................. 2003-309535

(51) Int. Cl.
*C22B 11/00*   (2006.01)
*C01G 5/02*    (2006.01)
(52) U.S. Cl. .......................... 75/370; 423/23; 423/491
(58) Field of Classification Search ................. 75/370; 423/23–48, 491
See application file for complete search history.

(56) References Cited

U.S. PATENT DOCUMENTS

| | | | | |
|---|---|---|---|---|
| 3,966,891 A | * | 6/1976 | Renault et al. | 423/574.1 |
| 5,171,658 A | * | 12/1992 | Fyson | 430/393 |
| 5,749,940 A | * | 5/1998 | Narita | 75/711 |
| 5,885,535 A | * | 3/1999 | Asano et al. | 423/24 |

FOREIGN PATENT DOCUMENTS

| | | |
|---|---|---|
| JP | 4-504882 | 8/1992 |
| JP | 3086655 | 7/2000 |
| JP | 2000-297332 | 10/2000 |
| JP | 2001-316736 | 11/2001 |
| JP | 2003-105456 | 4/2003 |

OTHER PUBLICATIONS

Katsutoshi, JP 09-316559 Machine Translation, Production of Reduced Silver, Sep. 12, 1997.*

* cited by examiner

*Primary Examiner*—Roy King
*Assistant Examiner*—Jie Yang
(74) *Attorney, Agent, or Firm*—Edwards Angell Palmer & Dodge LLP

(57) ABSTRACT

A method of efficient separation/purification for obtaining high-purity silver chloride which eliminates the necessity of a pretreatment of a refining intermediate comprising sparingly soluble silver compounds and impurity elements when silver chloride is separated from the refining intermediate and purified to a high degree and which enables the silver chloride to be used as a raw material to give high-purity silver metal without necessitating the pyrometallurgical refining or electro-refining of the silver metal. The method is characterized by comprising: a leaching step in which the refining intermediate is leached with an aqueous sulfite solution to extract silver with the solution to thereby form a silver-containing liquid resulting from the leaching and an insoluble residue; a silver chloride generation step in which the liquid resulting from the leaching is neutralized and acidified to precipitate silver chloride and thereby form the silver chloride and a mother liquor; and a silver chloride purification step in which the silver chloride is oxidized in an acidic aqueous solution by adding an oxidizing agent to dissolve and separate impurity elements and thereby form purified silver chloride and a solution containing the impurity elements.

13 Claims, 1 Drawing Sheet

METHOD OF SEPARATION/PURIFICATION FOR HIGH-PURITY SILVER CHLORIDE, AND PROCESS FOR PRODUCING HIGH-PURITY SILVER BY THE SAME

BACKGROUND OF THE INVENTION

1. Field of the Invention

The present invention relates to a method of separation/purification for high-purity silver chloride and a process for producing high-purity silver by the same, more specifically a method of separation/purification for high-purity silver chloride which, when a refining intermediate containing a sparingly soluble silver compound and one or more species of impurity elements is treated to separate high-purity silver chloride therefrom, needs no pretreatment step for the intermediate and which, when the high-purity silver is treated as a starting material to produce high-purity silver, can dispense with a reprocessing step by pyrometallurgical refining or electro-refining for metallic silver, and a process for producing high-purity silver by the same.

2. Description of the Prior Art

Silver has been traditionally recovered from anode slime discharged from an electro-refining step for smelting of copper, lead or the like. One of the methods widely used for separation/purification of high-purity silver from anode slime involves a pyrometallurgical treatment step for producing crude silver from the slime and pyrometallurgical refining or electro-refining step for treating the crude silver.

The pyrometallurgical treatment step involves environment-related problems caused by discharged dust and/or exhaust gases, and also problems related to working conditions, because it needs works in a hot atmosphere which may cause burn injuries. Under these situations, a hydrometallurgical process has been attracting attention for separation/recovery of silver.

For example, one method first converts a silver compound into a sparingly soluble compound, e.g., silver halide or sulfide, to preliminarily separate silver. It is widely used as one of the methods for separation/recovery of silver from an aqueous solution or solid by a hydrometallurgical process. This method can separate silver from most of concomitantly present metals, beginning with noble metals, e.g., gold and platinum group elements. However, the sparingly soluble compound is soluble to only a limited extent not only in water but also in an acidic or alkaline aqueous solution, and the separated silver compound is difficult to directly treat by the hydrometallurgical process to produce high-purity silver.

In order to solve the above problems, silver recovering methods in which a sparingly soluble silver compound produced from anode slime is treated as a staring materials, have been proposed. Some of the representative methods are described below. They involve their own problems.

(1) A method which leaches a starting material containing a sparingly soluble silver compound by an ammonia solution, and reduces the leaching liquor by a reducing agent (refer to, e.g., JP-A-2000-297332 (pages 1 and 2)). This method, although including no pretreatment step, gives a crude silver product containing a smaller quantity of impurities than the above-described pyrometallurgical process. The problems involved in this method, however, are large consumption of ammonia by lead chloride, and need for an electro-refining step to produce high-purity silver, otherwise purity of silver it gives is limited to 99% or so.

(2) A method comprising several steps for leaching anode slime, which is treated to remove copper beforehand, in the presence of hydrochloric acid and hydrogen peroxide; treating the leaching residue with sodium carbonate to covert lead chloride into the carbonate; ammonia-aided leaching to extract silver chloride into a solution; neutralization with sulfuric acid to precipitate silver chloride; chloro-scrubbing of the precipitation with hydrochloric acid and hydrogen peroxide; treating the chloro-scrubbing residue with sodium hydroxide to convert silver chloride into silver oxide, and reducing the silver oxide into a high-quality product by reducing silver with a reducing agent, e.g., a saccharide having a reducing capability, hydrazine monohydrate (refer to, e.g., JP-B-3,086,655 (pages 1 and 2)).

One of the problems involved in this method, however, is need for a lead-removing step, proposed to avoid consumption of ammonia by lead chloride in the ammonia-aided leaching step. Therefore, it additionally needs an agent for removing lead, and hence a process comprising leaching, filtration, decomposition of the leaching liquor and filtration. Moreover, it additionally needs a step for treating the separated lead compound. Still more, it is difficult for this method to recover silver having a purity exceeding 99.99%.

(3) A method which recovers silver from a starting material containing one or more species of noble metals including silver, and lead. It comprises several steps for leaching the starting material by chloridation to form a precipitation containing silver and lead chlorides and solid-liquid separation to recover the precipitation containing silver and lead chlorides; repulping the precipitation containing silver and lead chlorides with water and reducing the slurry with powdered iron to recover a mixture containing metallic silver and lead; oxidation of the mixture containing silver and lead at high temperature in a dry furnace to form slag containing crude silver and lead oxide; and separation of crude silver and electro-refining of crude silver into high-purity silver (refer to, e.g., JP-A-2001-316736 (pages 1 and 2)).

One of the problems involved in this method, however, is that it basically shows no improvement in solving the above problems inherent in the pyrometallurgical process.

(4) A method which comprises several steps for pretreatment of a chlorine-aided leaching residue containing silver chloride as a major component with a 40 to 80 g/L NaOH solution; leaching the residue with a 80 to 150 g/L sodium thiosulfate solution to produce the liquor containing silver; extraction of the liquor with a 0.1 to 1M/L tricapryl methylammonium salt solution to separate silver; stripping of the extract with a 1 to 2.5M/L alkaline nitrate solution; and reducing the strip liquor to produce metallic silver (refer to, e.g., JP-A-2003-105456 (pages 1 and 2)).

One of the problems involved in this method, however, is need for a large-size system and hence high investment cost, because of low silver concentration of the silver strip liquor. Another problem is difficulty in increasing silver purity, because of lack of purification step for strip liquor.

As discussed above, the methods proposed so far for separating silver by leaching from a sparingly soluble silver compound, e.g., silver chloride, in the presence of an ammonia or sodium thiosulfate solution have a common problem that they need a reprocessing step by pyrometallugical refining or electro-refining for silver recovered by reduction, because many impurity metals which can form a complex with ammonia or sodium thiosulfate are simultaneously leached in the leaching step.

When ammonia is used, the silver ion may react with ammonia while being settled to form an unstable, explosive silver compound, e.g., fulminating silver, which poses an obstacle to liquid storage or recycling. When sodium thiosulfate is used, on the other hand, silver sulfide tends to precipitate, while the solution is stored, the reaction being notably accelerated when the solution decreases in pH level or increases in temperature. This may increase concentration of sulfur present in metallic silver, when it is recovered by electrolysis or reduction.

It is also known that an organophosphorus compound, e.g., alkyl phosphine sulfide, can selectively extract silver as one of other methods for separating an impurity element. However, it cannot be used for separation by solvent extraction from leaching liquor produced by leaching with a thiosulfate, because silver reacts with the thiosulfate ion to form a stable complex.

Under these situations, there are demands for separation/purification methods which efficiently produce high-purity silver chloride and silver from a refining intermediate containing a sparingly soluble silver compound and one or more species of impurity elements without needing a pretreatment step for the intermediate and reprocessing step for recovered metallic silver by pyrometallurgical refining or electro-refining.

SUMMARY OF THE INVENTION

The present invention is developed to solve the above problems. It is an object of the present invention to provide a method of separation/purification for high-purity silver chloride which, when a refining intermediate containing a sparingly soluble silver compound and one or more species of impurity elements is treated to separate silver chloride therefrom, needs no pretreatment step for the intermediate, and which, when the high-purity silver is treated as a starting material to produce high-purity silver, can dispense with a reprocessing step by pyrometallurgical refining or electro-refining for metallic silver. It is another object to provide a process for producing high-purity silver by the same.

The inventors of the present invention have found, after having extensively studied methods of separation/purification for high-purity silver chloride from a refining intermediate containing a sparingly soluble silver compound and one or more species of impurity elements to achieve the above objects, that high-purity silver chloride can be produced by a process comprising steps for treating the refining intermediate by leaching in an aqueous sulfite solution, production of silver chloride from the leaching liquor after it is made acidic and purification of the silver chloride, effected in this order, and that high-purity silver can be produced from the high-purity silver chloride as a starting material, achieving the present invention.

The first aspect of the present invention is a method of separation/purification for high-purity silver chloride from a refining intermediate containing a sparingly soluble silver compound and one or more species of impurity elements, comprising:
(1) a leaching step in which the refining intermediate is leached with an aqueous sulfite solution to extract silver with the solution and thereby form a silver-containing liquid resulting from the leaching and an insoluble residue,
(2) a silver chloride generation step in which the liquid resulting from the leaching is neutralized and acidified to precipitate silver chloride and thereby form the silver chloride and a mother liquor, and
(3) a silver chloride purification step in which the silver chloride is oxidized in an aqueous acidic solution by adding an oxidizing agent to dissolve and separate impurity elements and thereby form purified silver chloride and a solution containing the impurity elements.

The second aspect of the present invention is the method of the first aspect of separation/purification for high-purity silver chloride, wherein the aqueous sulfite solution for the leaching step contains the sulfite ion at 70 to 160 g/L.

The third aspect of the present invention is the method of the first aspect of separation/purification for high-purity silver chloride, wherein the leaching step is carried out at a pH of 8 to 12.

The fourth aspect of the present invention is the method of the first aspect of separation/purification for high-purity silver chloride, wherein the leaching step is carried out at 20 to 80° C.

The fifth aspect of the present invention is the method of the first aspect of separation/purification for high-purity silver chloride, wherein the aqueous sulfite solution for the leaching step is an absorbent solution of hydroxide and/or carbonate of alkali metal in which sulfur dioxide gas discharged from a smelting step for extractive metallurgy is absorbed.

The sixth aspect of the present invention is the method of the fifth aspect of separation/purification for high-purity silver chloride, wherein sulfur dioxide gas and hydroxide and/or carbonate of alkali metal is further dissolved in the absorbent solution to adjust the sulfite ion concentration at a given level.

The seventh aspect of the present invention is the method of the first aspect of separation/purification for high-purity silver chloride, wherein the silver chloride generation step is carried out at a pH of 0 to 4.5.

The eighth aspect of the present invention is the method of the first aspect of separation/purification for high-purity silver chloride, wherein the oxidation treatment is carried out at an oxidation-reduction potential of 800 to 1200 mV, determined using a silver/silver chloride reference electrode, in the silver chloride purification step.

The ninth aspect of the present invention is the method of the first aspect of separation/purification for high-purity silver chloride, wherein the silver chloride purification step further includes washing step in which the silver chloride resulting from the oxidation treatment is treated with an aqueous solution containing a complex-forming compound to transform impurity elements remaining in the silver chloride into the form of complex ions and thereby to dissolve the impurity elements from the silver chloride.

The tenth aspect of the present invention is the method of the ninth aspect of separation/purification for high-purity silver chloride, wherein the complex-forming compound is an aminocarboxylic acid compound.

The 11$^{th}$ aspect of the present invention is the method of the ninth aspect of separation/purification for high-purity silver chloride, wherein the washing treatment is carried out at a pH of 4 to 12.

The 12$^{th}$ aspect of the present invention is a process for producing high-purity silver, wherein the high-purity silver chloride separated/purified by the method of one of the first to 11$^{th}$ aspects is treated in an aqueous alkaline solution in the presence of a reducing agent thereby to produce metallic silver powder.

The 13$^{th}$ aspect of the present invention is the process of the 12$^{th}$ aspect for producing high-purity silver, wherein the aqueous alkaline solution is incorporated with a hydroxide and/or carbonate of alkali metal at 1 to 5 equivalents per equivalent of silver.

The 14$^{th}$ aspect of the present invention is the process of the 12$^{th}$ aspect for producing high-purity silver, wherein the treatment in the presence of a reducing agent is carried out at 70 to 100° C.

The method of the present invention of separation/purification for high-purity silver chloride which, when a refining intermediate containing a sparingly soluble silver compound and one or more species of impurity elements is to be treated to separate high-purity silver chloride therefrom, needs no pretreatment step for the intermediate.

The process of the present invention for producing high-purity silver which, when the high-purity silver chloride produced by the above method as a starting material is to be treated to produce metallic silver, needs no reprocessing step by pyrometallurgical refining or electro-refining to produce high-purity silver. Therefore, the present invention is of very high industrial value, because it provides a method for efficient separation/purification for high-purity silver chloride and a process for producing high-purity silver by the same.

DETAILED DESCRIPTION OF THE INVENTION

Figure 1:
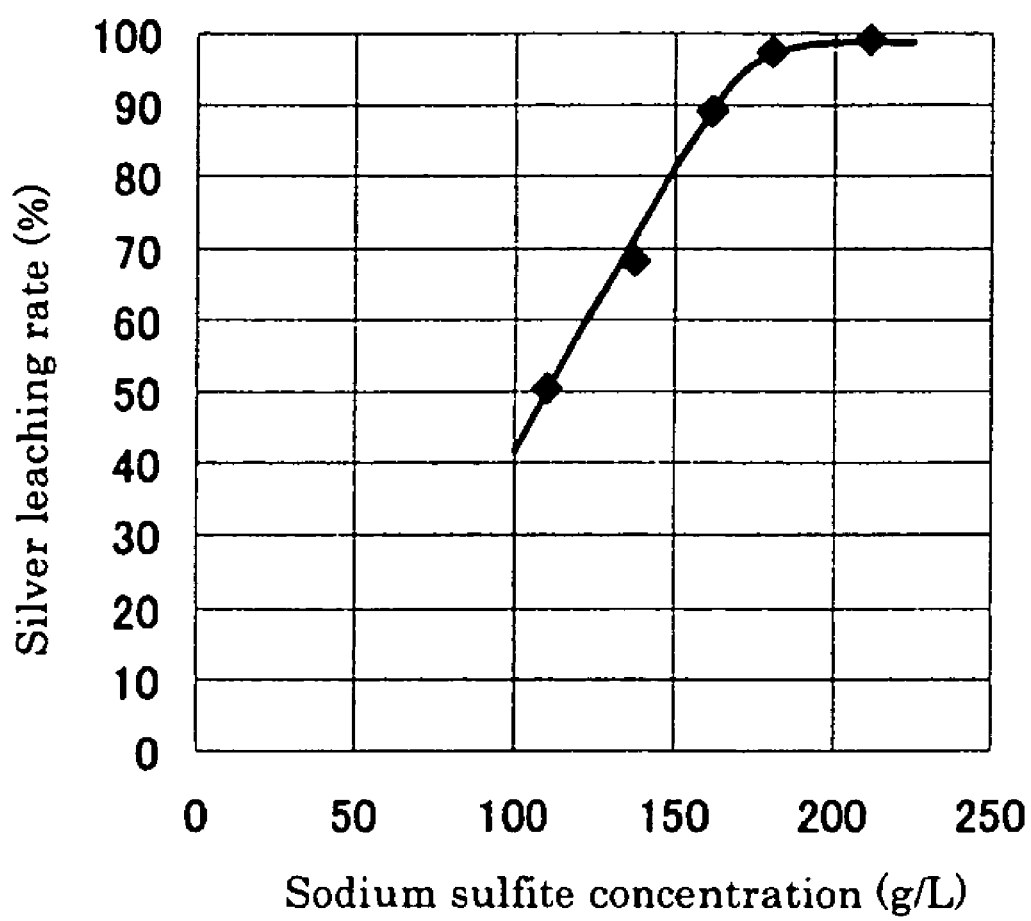
FIG. 1 presents the relationship between silver leaching rate and concentration of sodium sulfite in the absorbent solution, established in EXAMPLE 1.

The method of separation/purification for high-purity silver chloride and process for producing high-purity silver from the silver chloride, both of the present invention, are described in detail.

The method of the present invention of separation/purification for high-purity silver chloride treats a refining intermediate containing a sparingly soluble silver compound and one or more species of impurity elements to produce high-purity silver chloride, comprising a leaching step in which the refining intermediate is leached with an aqueous sulfite solution to extract silver with the solution and thereby form a silver-containing liquid resulting from the leaching and an insoluble residue, a silver chloride generation step in which the liquid resulting from the leaching is neutralized and acidified to precipitate silver chloride and thereby form the silver chloride and a mother liquor, and a silver chloride purification step in which the silver chloride is oxidized in an aqueous acidic solution by adding an oxidizing agent to dissolve and separate impurity elements and thereby form purified silver chloride and a solution containing the impurity elements.

The silver chloride purification step may further include a step, subsequent to the oxidation treatment step, for washing the oxidized silver chloride with an aqueous solution containing a complex-forming compound to transform an impurity element remaining in the silver chloride into the form of complex ion and thereby to elute out from the silver chloride.

It is essential for the present invention to react silver with the sulfite ion to form a stable sulfite complex in the leaching step, and to acidify the leaching liquor to separate out the sparingly soluble silver chloride therefrom. These features allow the method of the present invention to selectively dissolve and separate silver in the leaching step from other elements concomitantly present in the refining intermediate, and to selectively precipitate and separate silver in the silver chloride generation step from the leaching liquor. Moreover, silver chloride is sparingly soluble, a property which can be utilized to dissolve and separate the impurity element(s) by the aid of a given agent in the silver chloride purification step.

(1) Refining Intermediate Containing a Sparingly Soluble Silver Compound and One or More Species of Impurity Elements The refining intermediate containing a sparingly soluble silver compound and one or more species of impurity elements, as a starting material for the present invention, is not limited. It may be anode slime discharged from an electro-refining step in a process for smelting of copper, nickel, lead or the like, to begin with; or another refining intermediate, e.g., that discharged from a silver-containing solution treatment step (e.g., that for plating solution or photographic development solution) or from a noble metal refining step.

The impurity metal may be copper, nickel, lead, iron, cobalt, manganese, sulfur, zinc, cadmium, tin, a 15 group element (e.g., arsenic, antimony or bismuth), 16 group element (e.g., selenium or tellurium), gold or platinum group element.

(2) Leaching Step

The leaching step for the present invention treats the refining intermediate in an aqueous sulfite solution, to produce the leaching liquor and insoluble residue, where silver is extracted in the former. In this step, the refining intermediate is suspended in the aqueous sulfite solution.

The leaching reaction is represented by Formula 1, described below, when the sulfite is sodium sulfite and the sparingly soluble silver compound is silver chloride:

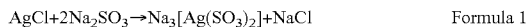

$$AgCl + 2Na_2SO_3 \rightarrow Na_3[Ag(SO_3)_2] + NaCl \quad \text{Formula 1}$$

Formula 1 represents the reaction between silver chloride and sodium sulfite to produce $Na_3[Ag(SO_3)_2]$ as a sulfite complex of silver.

The initial slurry concentration of the suspension in the above step is not limited, but preferably 10 to 1000 g/L, viewed from slurry handling.

The sulfite ion concentration of the aqueous sulfite solution for the above step is not limited, but preferably 70 to 160 g/L, more preferably 95 to 130 g/L. At below 70 g/L, dissolution of the silver compound in the aqueous sulfite solution is limited, which increases plant size. Dissolution of the silver compound is accelerated as sulfite ion concentration increases. However, dissolution of the sulfite ion in an aqueous solution is limited to 160 g/L or less on an industrial scale, although this level varies depending on quantity of the ions other than sulfite in the solution.

The sulfite for the present invention is not limited, and may any one may be used so long as it is soluble in water. It may be selected from potassium, sodium, calcium, ammonium, cesium and rubidium sulfites, an amine, and the like, of which sodium sulfite is more preferable viewed from economic efficiency and availability.

The method for producing the aqueous sulfite solution is not limited. It may be produced by dissolving the sulfite described above in water, and other methods, e.g., by reacting a hydroxide and/or carbonate of an alkali and/or alkali-earth metal with sulfur dioxide gas. Of these methods, the more preferable one uses an aqueous solution, working as an absorbent solution, of hydroxide and/or carbonate of alkali metal in which sulfur dioxide gas discharged from a smelting step in a sulfuric acid production process for extractive metallurgy is dissolved, because the solution is available at low cost on an industrial scale. In particular, it will have still enhanced economic efficiency by utilizing a sulfite-containing waste solution discharged from an absorber tower which removes sulfur dioxide remaining unreacted in a process for producing sulfuric acid from a smelting gas.

Concentration of the sulfite ion in an industrially available absorbent solution varies in a range from 30 to 130 g/L, because of fluctuated quantities of sulfur dioxide gas evolved and the sulfite ion partly being converted into the sulfate ion as the solution is recycled. It is preferable to control the sulfite ion concentration at 70 to 160 g/L by further dissolving sulfur dioxide gas and hydroxide and/or carbonate of alkali metal in the solution, when it is below the preferable range, described above.

The above step is carried out preferably at a pH of 8 to 12, more preferably 10 to 11. At below 8, transformation of the sulfite into the bisulfite rapidly starts with the result that dissolution of the silver compound may be insufficient. At above 12, on the other hand, the reaction represented by Formula 2 described below is accelerated, and metallic silver separates out from $Na_3[Ag(SO_3)_2]$ to deteriorate apparent leaching rate.

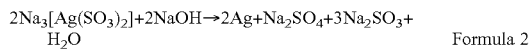
Formula 2

Formula 2 represent the reaction by which $Na_3[Ag(SO_3)_2]$ is decomposed in a high alkaline condition to separate out metallic silver.

The above step is carried out preferably at 20 to 80° C., more preferably 30 to 60° C. At below 20° C., solubility of the sulfite ion decreases to make it difficult to keep concentration of the sulfite in the aqueous sulfite solution at 70 g/L or more. At above 80° C., on the other hand, the silver compound is reduced to metallic silver by the reaction of Formula 2.

It is preferable to prevent, as far as possible, the aqueous sulfite solution from being engulfed with and coming into contact with air, because the sulfite ion in the aqueous solution tends to be transformed into the sulfate ion by oxidation, to lose capability of forming a complex with silver, and, at the same time, loses capability of dissolving the sulfite ion as its sulfate concentration increases.

(3) Silver Chloride Generation Step

The silver chloride generation step neutralizes and acidifies the leaching liquor from the leaching step to produce precipitated silver chloride and mother liquor. This step controls the leaching liquor at a given pH level with a pH adjuster. When the refining intermediate as a starting material contains a sparingly soluble silver compound other than the chloride, it is incorporated with a given quantity of the chloride ion to separate it in the form of silver chloride. The chloride ion source is preferably a water-soluble chloride, e.g., hydrochloric acid, sodium chloride or the like.

The pH level for the above step is not limited, but preferably 0 to 4.5, more preferably 1 to 2. The sulfite ion is transformed into the hydrogensulfite ion, sulfurous acid and sulfur dioxide consecutively, when the solution is kept at a pH of 4.5 or less to lose its complex-forming capability. As a result, silver can be recovered almost totally as silver chloride.

The pH adjuster for the above step is not limited, and may be selected from mineral acids e.g., sulfuric and hydrochloric acids, of which sulfuric acid is more preferable.

Temperature for the above step is not limited, but preferably 20 to 100° C.

The silver chloride produced by the method of the present invention is almost free of other elements present in the starting material, when treated by the leaching and silver chloride generation steps. However, impurity elements present in the aqueous sulfite solution, e.g., gold, selenium, tellurium, lead, bismuth and iron, are partly separated out simultaneously with silver. The mother liquor contains a limited quantity of environment-impacting substances and no noble metals. Therefore, it needs no special step for waste water treatment, unlike the one subjected to ammonia treatment.

(4) Silver Chloride Purification Step

The silver chloride purification step for the present invention oxidizes the silver chloride, produced in the previous step, with an oxidizing agent in an aqueous acidic solution, to produce high-purity silver chloride refined by dissolving the impurity element(s) and a solution in which the impurity element(s) is/are dissolved. In this step, silver chloride is suspended in the aqueous acidic solution, to which an oxidizing agent is added while controlling oxidation-reduction potential of the solution.

Slurry concentration of the suspension for the above step is not limited, but preferably 100 to 500 g/L, viewed from improved slurry dispersibility and prevention of impurity element re-adsorption.

The aqueous acidic solution for the above step is not limited, and may be selected from various mineral acids, of which hydrochloric acid is more preferable, because it can generate chlorine in the presence of an oxidizing agent to facilitate dissolution of an impurity element present in the metallic form and is expected to evolve chloride of the impurity elements, which has a high solubility in water.

Oxidation-reduction potential for the above step is not limited, but is preferably controlled at 800 to 1200 mV, determined using a silver/silver chloride reference electrode, more preferably 900 to 1000 mV. An element, e.g., Se or Te, which is present in the form of metal or intermetallic compound and, when oxidized, becomes soluble in an aqueous acidic solution can be dissolved in the solution controlled at an oxidation-reduction potential of 800 mV or more.

The oxidizing agent for the above step is not limited, and is selected from chlorine gas, hydrogen peroxide solution, chlorate and the like, which contaminate silver chloride to a lesser extent.

Reaction temperature for the above step is not limited, but preferably 40 to 80° C., although the reaction rate increases as temperature increases. At below 40° C., the element dissolution reaction rate is insufficient. At above 80° C., on the other hand, self-decomposition of hydrogen peroxide solution or chlorate, when it is used, is also accelerated to increase its consumption.

The silver chloride produced by oxidation in the silver chloride purification step may be contaminated with trace quantities of a lead compound, e.g., lead chloride, lead sulfate or the like.

The separation/purification method of the present invention may include, as required, another silver chloride purification step described below (hereinafter referred to as the second silver chloride purification step), subsequent to the above-described oxidation-based silver chloride purification step. The second silver chloride purification step washes the oxidized silver chloride with an aqueous solution containing a complex-forming compound to transform an impurity element concomitantly present in the silver chloride into the form of complex ion and thereby to elute out from the silver chloride.

The second silver chloride purification step suspends the silver chloride, refined by the previous oxidation treatment, in an aqueous solution containing a complex-forming compound for washing.

Slurry concentration of the suspension for the above washing step is not limited, but preferably 100 to 500 g/L, viewed from improved slurry dispersibility.

The complex-forming compound for the above washing treatment is not limited, but an aminocarboxylic acid-based one, e.g., ethylenediamine tetraacetic acid (EDTA) or diethylenetriamine pentaacetic acid (DTPA), is preferable, because it can form a stable complex ion with an objective component, e.g., lead chloride or sulfate, while keeping silver chloride undissolved. The aqueous solution used for the washing treatment can separate/recover the aminocarboxylic acid-based compound, when incorporated with a small quantity of hydrochloric acid or the like to be kept at a pH of 4.0 or less. It can be recycled repeatedly to work as the solution containing a complex-forming compound, when incorporated with a small quantity of the make-up solution.

The pH level for the above washing step is not limited, but preferably 4 to 12, more preferably 5 to 7. At below 4, the complex-forming agent may separate out. At above 12, on the other hand, some metals, e.g., selenium, may be reduced to contaminate silver chloride.

The oxidation-based chloride purification step removes impurity elements, e.g., gold, selenium, tellurium, lead, bismuth and iron, to produce high-purity silver chloride. The washing-based second chloride purification step further removes lead.

The method of the present invention for producing high-purity silver treats the high-purity silver chloride in the presence of a reducing agent in an aqueous alkaline solution to produce metallic silver powder. This step may be carried out by suspending the high-purity silver chloride in an aqueous alkaline solution.

The initial slurry concentration of the high-purity silver chloride is not limited, but preferably 100 to 500 g/L, viewed from improved slurry dispersibility.

The aqueous alkaline solution for the above method is not limited, but preferably prepared with 1 to 5 equivalents of hydroxide and/or carbonate of alkali metal per equivalent of silver. At one equivalent or more, contamination of metallic silver by unreduced silver chloride can be avoided. At above 5 equivalents, on the other hand, little effect will be expected for the increased quantity of the solution, and not economical. It is more preferable to incorporate the alkali(s) to keep the aqueous alkaline solution at a pH of 13 or more.

The hydroxide and/or carbonate of alkali metal is not limited, and water-soluble alkali metal compounds, ammonium compounds or the like can be used, of which sodium hydroxide is more preferable in consideration of waste water treatment load and economic cost.

The reducing agent for the above method is not limited, but is selected from hydrazine monohydrate, saccharides, formalin and the like, because of limited contamination of silver they may cause. Its content can be adjusted by oxidation-reduction potential of the solution. More specifically, the end point is a point at which oxidation-reduction potential is stabilized at −700 mV or less, determined using a silver/silver chloride reference electrode.

The reduction temperature is not limited, but preferably 70 to 100° C., at which the reaction can be accelerated, more preferably 90 to 100° C. At below 70° C., residual silver chloride will increase. At above 100° C., on the other hand, a pressure vessel will be required. It is particularly preferable to carry out the reduction treatment at 90° C. or higher using the aqueous alkaline solution adjusted at a pH of 13 or more with the alkali(s), in order to decrease residual silver chloride.

Repeating the reduction treatment is effective in order to further decrease residual silver chloride. Only a small quantity of reducing agent is sufficient for the additional reduction treatment, because of trace quantities of silver chloride to be reduced.

The above-described process for producing high-purity silver can give metallic silver powder having a purity of 99.99% or more.

EXAMPLES

The present invention is described in more detail by EXAMPLE and COMPARATIVE EXAMPLES, which by no means limit the present invention. The metals were analyzed by ICP or emission spectrometry in these examples.

The starting material used in these examples was a chlorine leaching residue of anode slime, discharged from a copper electrolysis process. The composition is given in Table 1.

TABLE 1

| Ag | Au | Pd | Cu | Pb | Se | Te | Bi |
|---|---|---|---|---|---|---|---|
| 15.8 | 0.02 | 0.001 | 0.10 | 16.2 | 0.28 | 0.82 | 0.53 |

(Unit: % by weight)

Example 1

The starting material, i.e., the chlorine leaching residue described above, was treated by a series of steps of leaching, silver chloride generation and silver chloride purification for the method of the present invention for separation/purification for high-purity silver chloride. The product from each step was reduced to metallic silver by the method of the present invention for producing high-purity silver, to analyze the resulting silver powder.

(1) Leaching Step

Two types of solution were prepared for the leaching step; one was an aqueous sulfite solution prepared using a sodium sulfite reagent and the other was prepared by absorbing sulfur dioxide gas, discharged from a smelting step for extractive metallurgy, in an aqueous sodium hydroxide solution.

For the treatment with the aqueous sulfite solution prepared using a sodium sulfite reagent, 45 g (on the wet basis) of the chlorine leaching residue was suspended in 400 mL of water, and 100 g of sodium sulfite anhydrous was dissolved in the resulting slurry. The mixture was stirred for 1 hour to extract silver, and the slurry was treated by solid/liquid separation into the leaching liquor and residue. The leaching liquor and residue contained silver at 14 g/L and 0.2% by weight, respectively. The leaching rate was 99%.

For the treatment with the aqueous sulfite solution, which was an absorbent solution prepared by absorbing sulfur dioxide gas, discharged from a smelting step for extractive metallurgy, in an aqueous sodium hydroxide solution, gases with the above sulfur dioxide as the major component were absorbed in a 24% by weight aqueous sodium hydroxide solution to prepare the absorbent solution. The absorbent solution was adjusted at a pH of 10 with a 24% by weight aqueous sodium hydroxide solution and filtered, and 45 g of the chlorine leaching residue was suspended in the filtrate. The mixture was stirred for 1 hour to extract silver. Silver contents of the leaching liquor and residue were analyzed to determine silver leaching rate. FIG. 1 shows the effect of sodium sulfite content of the absorbent solution on silver leaching rate.

As shown in FIG. 1, silver leaching rate increased with sodium sulfite content, reaching an equilibrium when sodium sulfite content increased to 200 g/L (127 g/L as the sulfite ion) or more. A good leaching rate, 99% as the equilibrium level, was secured.

(2) Silver Chloride Generation

The leaching liquor prepared in the above step was adjusted at a pH of 1 with diluted sulfuric acid, and held for 1 hour. The reaction was carried out in a fume hood, because of decomposition of sodium sulfite to evolve sulfur dioxide gas. The precipitation with silver chloride as the major component was recovered. The precipitation was adjusted at a pH of 10 with water and sodium hydroxide, and incorporated with hydrazine monohydrate (concentration: 60% by weight) until its oxidation-reduction potential was stabilized, to evaluate its purification extent. The silver powder product was analyzed. The results are given in Table 2. The qualitative analysis results are given in Table 4.

TABLE 2

| Leaching solution | Se | Cu | Pb | Fe | Te | Au |
|---|---|---|---|---|---|---|
| Sodium sulfite reagent | 605 | 1 | 32 | 2 | 1 | 3 |
| Absorbent solution | 680 | 4 | 11 | 2 | 1 | 14 |

(Silver chloride was recovered from the leachate solution and reduced to metallic silver. Unit: ppm)

As shown in Table 2, the differences are not much in impurity levels in the silver powder, whether the solution was prepared using a sodium sulfite reagent or by absorbing sulfur dioxide gas, discharged from a smelting step for extractive metallurgy.

(3) Silver Chloride Purification Step

The silver chloride produced in the above step with the aqueous sulfite solution prepared using a sodium sulfite reagent was oxidation-treated, for which 2 types of oxidizing agents, hydrogen peroxide solution and sodium chlorate, were prepared.

For the treatment with a hydrogen peroxide solution, 250 g (wet basis) of the silver chloride was suspended in 500 mL of a 6 mols/L hydrochloric acid solution, and the resulting slurry was heated to 60° C., to which 50 mL of a hydrogen peroxide solution was added dropwise in around 1 hour for oxidation.

For the treatment with sodium chlorate, the above-described slurry incorporated with 10 mL of 44% by weight sodium chlorate was heated to 80° C., at which it was held for 1 hour for oxidation.

The slurries had an oxidation-reduction potential of 1000 mV or more, determined using a silver/silver chloride reference electrode, in both cases. The slurry was cooled and treated by solid/liquid separation to recover silver chloride, which was then sufficiently washed. In order to evaluate extent of purification of the resulting precipitation, the recovered silver chloride was adjusted at a pH of 10 with water and sodium hydroxide, and incorporated with hydrazine monohydrate (concentration: 60% by weight) until its oxidation-reduction potential was stabilized. The silver powder product was analyzed. The results are given in Table 3.

Then, 250 g (wet basis) of the oxidation-treated silver chloride was suspended in 500 mL of a 0.1 mols/L EDTA solution, adjusted at a pH of 6 with an aqueous sodium hydroxide solution. The resulting suspension was stirred for 1 hour, and treated by solid/liquid separation to recover silver chloride, which was sufficiently washed.

Next, 250 g (wet basis) of the silver chloride was suspended 1000 mL of an 8.6% by weight aqueous sodium hydroxide solution, heated to 70° C., and incorporated with hydrazine monohydrate (concentration: 60% by weight) until its oxidation-reduction potential was stabilized at −700 mV or less. The silver powder product was analyzed. The results are given in Table 3.

TABLE 3

| Oxidation treatment | Washing treatment | Se | Cu | Pb | Fe | Te | Au | Bi |
|---|---|---|---|---|---|---|---|---|
| Hydrogen peroxide | Not used | 2 | <1 | 3 | 2 | <1 | 2 | <1 |
| Sodium chlorate | Not used | 2 | <1 | 9 | 2 | <1 | 2 | <1 |
| Hydrogen peroxide | EDTA | 1 | <1 | 1 | 2 | <1 | 2 | <1 |

(Silver chloride, recovered in each step, was reduced to metallic silver. Unit: ppm)

As shown in Table 3, the metallic silver powder having a purity of 99.99% or more can be produced from the high-purity silver chloride, produced by treating the chlorine leaching residue treated by the step for the present invention. The metallic silver powder has a still higher purity of 99.999%, when the chloride purification step adopts washing with an EDTA solution to further decrease Pb and Se contents.

Comparative Example 1

The chlorine leaching residue was leaching-treated with ammonia as a leaching agent, and the resulting silver powder was evaluated.

In the leaching step, 45 g (wet basis) of the chlorine leaching residue (refer to Table 1 for its composition) was suspended in 400 mL of a, 6% by weight aqueous ammonia solution, and stirred for 1 hour to extract silver. The resulting leaching liquor was neutralized with 60 mL of diluted sulfuric acid to precipitate and recover silver chloride. The recovered silver chloride was adjusted at a pH of 10 with water and sodium hydroxides and incorporated with hydrazine monohydrate (concentration: 60% by weight) until its oxidation-reduction potential was stabilized, to evaluate the resulting silver powder by qualitative analysis. The results are given in Table 4.

Comparative Example 2

The chlorine leaching residue was leaching-treated with sodium thiosulfate as a leaching agent, and the resulting silver powder was evaluated.

In the leaching step, 45 g (wet basis) of the chlorine leaching residue (refer to Table 1 for its composition) was suspended in 400 mL of an aqueous solution in which 96 g of sodium thiosulfate was dissolved, and stirred for 1 hour to extract silver. The resulting leaching liquor was neutralized with 60 mL of diluted sulfuric acid to precipitate and recover silver chloride. The recovered silver chloride was adjusted at a pH of 10 with water and sodium hydroxide, and incorporated with hydrazine monohydrate (concentration: 60% by weight) until its oxidation-reduction potential was stabilized, to evaluate the resulting silver powder by qualitative analysis. The results are given in Table 4.

TABLE 4

| | Leaching agent | Pb | Sb | Bi | Cu | Sn | Fe | Pd |
|---|---|---|---|---|---|---|---|---|
| EXAMPLE 1 | $Na_2SO_3$ | + | (±) | 2+ | 2+ | − | + | − |
| COMPARATIVE EXAMPLE 1 | $NH_3$ | 2+ | + | 2+ | 3+ | ± | + | 2+ |
| COMPARATIVE EXAMPLE 2 | $Na_2S_2O_3$ | 5+ | 2+ | 3+ | 3+ | ± | + | ± |

(Results of the qualitative analysis by emission spectrometry)

As shown in Table 4, it is found that EXAMPLE 1, carried out with a sulfite as a leaching agent in accordance with the method of the present invention, effectively removed impurity elements to give the silver powder of low impurity content. By contrast, COMPARATIVE EXAMPLE 1 or 2 failed to achieve the satisfactory results, because of insufficient selectivity of the leaching agent which could not meet the conditions for the present invention, and lack of an effective purification step. As a result, it produced the silver powder of higher impurity content than the method of the present invention.

It is apparent, as discussed above, that the method of separation/purification for high-purity silver chloride and process for producing high-purity silver from the silver chloride, both of the present invention, can be used to separate/refine high-purity silver chloride, and produce high-purity silver from the silver chloride by treating various starting materials, e.g., anode slime discharged from an electro-refining step in a process for smelting of copper, nickel, lead or the like, to begin with, and another refining intermediate, e.g., that discharged from a silver-containing solution treatment step (e.g., that for plating solution or photographic development solution) or that containing sparingly soluble silver compound and one or more impurity elements, discharged from a noble metal refining step. The method of the present invention for separation/purification for high-purity silver chloride is particularly suitable for treating chlorine leaching residue of anode slime.

What is claimed is:

1. A method of separation/purification for high-purity silver chloride from a refining intermediate containing a sparingly soluble silver compound and one or more species of impurity elements, comprising:
   (1) a leaching step in which the refining intermediate is leached with an aqueous sulfite solution to extract silver with the solution and thereby form a silver-containing liquid resulting from the leaching and an insoluble residue,
   (2) a silver chloride generation step in which the liquid resulting from the leaching is neutralized and acidified to precipitate silver chloride and thereby form the silver chloride and a mother liquor, and
   (3) a silver chloride purification step in which the silver chloride is oxidized in an aqueous acidic solution by adding an oxidizing agent to dissolve and separate impurity elements and thereby form purified silver chloride and a solution containing the impurity elements
   wherein the oxidation treatment is carried out at an oxidation-reduction potential of 800 to 1200 mV, determined using a silver/silver chloride reference electrode, in the silver chloride purification step.

2. The method according to claim 1 of separation/purification for high-purity silver chloride, wherein the aqueous sulfite solution for the leaching step contains the sulfite ion at 70 to 160 g/L.

3. The method according to claim 1 of separation/purification for high-purity silver chloride, wherein the leaching step is carried out at a pH of 8 to 12.

4. The method according to claim 1 of separation/purification for high-purity silver chloride, wherein the leaching step is carried out at 20 to 80° C.

5. The method according to claim 1 of separation/purification for high-purity silver chloride, wherein the aqueous sulfite solution for the leaching step is an absorbent solution of hydroxide and/or carbonate of alkali metal in which sulfur dioxide gas discharged from a smelting step for extractive metallurgy is absorbed.

6. The method according to claim 5 of separation/purification for high-purity silver chloride, wherein sulfur dioxide gas and hydroxide and/or carbonate of alkali metal is further dissolved in the absorbent solution to adjust the sulfite ion concentration at a given level.

7. The method according to claim 1 of separation/purification for high-purity silver chloride, wherein the silver chloride generation step is carried out at a pH of 0 to 4.5.

8. The method according to claim 1 of separation/purification for high-purity silver chloride,
   wherein the silver chloride purification step further includes washing step in which the silver chloride resulting from the oxidation treatment is treated with an aqueous solution containing a complex-forming compound to transform impurity elements remaining in the silver chloride into the form of complex ions and thereby to dissolve the impurity elements from the silver chloride.

9. The method according to claim 8 of separation/purification for high-purity silver chloride, wherein the complex-forming compound is an aminocarboxylic acid compound.

10. The method according to claim 8 of separation/purification for high-purity silver chloride, wherein the washing treatment is carried out at a pH of 4 to 12.

11. A process for producing high-purity silver, wherein the high-purity silver chloride separated/purified by the method of claim 1 is treated in an aqueous alkaline solution in the presence of a reducing agent and thereby produce metallic silver powder.

12. The process according to claim 11 for producing high-purity silver, wherein the aqueous alkaline solution is incorporated with a hydroxide and/or carbonate of alkali metal at 1 to 5 equivalents per equivalent of silver.

13. The process according to claim 11 for producing high-purity silver, wherein the treatment in the presence of a reducing agent is carried out at 70 to 100° C.

* * * * *